United States Patent
Tomatsu

(10) Patent No.: US 12,241,759 B2
(45) Date of Patent: Mar. 4, 2025

(54) QUALITY OF SERVICE FOR A VEHICULAR PLUG-AND-PLAY ECOSYSTEM

(71) Applicant: TOYOTA JIDOSHA KABUSHIKI KAISHA, Toyota (JP)

(72) Inventor: Nobuyuki Tomatsu, Toyota (JP)

(*) Notice: Subject to any disclaimer, the term of this patent is extended or adjusted under 35 U.S.C. 154(b) by 538 days.

(21) Appl. No.: 15/847,305

(22) Filed: Dec. 19, 2017

(65) Prior Publication Data
US 2019/0186962 A1  Jun. 20, 2019

(51) Int. Cl.
G01D 18/00 (2006.01)
G01D 3/02 (2006.01)
G05D 1/00 (2024.01)

(52) U.S. Cl.
CPC ........... G01D 18/008 (2013.01); G01D 3/022 (2013.01); *G05D 1/021* (2013.01)

(58) Field of Classification Search
CPC ....... G01D 3/022; G01D 18/008; G05D 1/021
See application file for complete search history.

(56) References Cited

U.S. PATENT DOCUMENTS

| | | | | |
|---|---|---|---|---|
| 4,845,649 A * | 7/1989 | Eckardt | .................. | B60C 23/043 702/104 |
| 5,214,582 A * | 5/1993 | Gray | .................... | G01R 31/007 702/182 |
| 9,950,577 B1 * | 4/2018 | Marlett | .................... | H04W 4/40 |
| 2003/0109939 A1 * | 6/2003 | Burgdorf | ............. | G01D 3/0365 700/71 |
| 2004/0030474 A1 * | 2/2004 | Samuel | ............. | B60G 17/0185 701/31.4 |

(Continued)

FOREIGN PATENT DOCUMENTS

DE    3446248 A1    6/1986
DE    112015004829 T5    8/2017

(Continued)

OTHER PUBLICATIONS

JPO, Notice of Reason for Rejection for Japanese Patent Application No. 2018-210753, Nov. 19, 2019, 4 pages.

(Continued)

*Primary Examiner* — Yoshihisa Ishizuka
(74) *Attorney, Agent, or Firm* — Burbage Law, P.C.; Jon-Michael Burbage

(57) ABSTRACT

The disclosure includes embodiments for improving quality of service for a vehicular plug-and-play ecosystem. A method according to some embodiments includes receiving environment data describing an environmental condition of a vehicle sensor. The method includes determining a quality of service value for the vehicle sensor based on the environment data. The method includes determining a corrected sensor measurement for the vehicle sensor based on the quality of service value. In some embodiments, the vehicle sensor includes a non-transitory memory that stores digital data that describes the environmental condition and the quality of service value for the vehicle sensor when it operates in the environmental condition. In some embodiments, the quality of service value is a factor that corrects the sensor measurement of the vehicle sensor when it operates in the environmental condition.

20 Claims, 12 Drawing Sheets

(56) References Cited

U.S. PATENT DOCUMENTS

| | | | | |
|---|---|---|---|---|
| 2005/0080543 | A1* | 4/2005 | Lu | B60G 17/0195 |
| | | | | 701/91 |
| 2005/0112426 | A1* | 5/2005 | Toth | H01M 8/04589 |
| | | | | 429/430 |
| 2009/0243402 | A1* | 10/2009 | O'Day | G01D 5/2449 |
| | | | | 318/135 |
| 2009/0248346 | A1* | 10/2009 | Fennel | G01C 25/00 |
| | | | | 702/96 |
| 2011/0286657 | A1* | 11/2011 | Yamada | G06T 7/001 |
| | | | | 382/149 |
| 2014/0310277 | A1* | 10/2014 | Ricci | G08G 1/164 |
| | | | | 707/736 |
| 2015/0166059 | A1* | 6/2015 | Ko | B60T 7/22 |
| | | | | 701/28 |
| 2017/0102251 | A1* | 4/2017 | Masson | H04L 67/12 |
| 2017/0235305 | A1* | 8/2017 | Jung | B60W 40/072 |
| | | | | 701/23 |
| 2017/0305417 | A1* | 10/2017 | Seurer | G08G 1/141 |
| 2018/0300816 | A1* | 10/2018 | Perl | G06Q 50/01 |

FOREIGN PATENT DOCUMENTS

| | | |
|---|---|---|
| JP | 62-501164 | 8/1987 |
| JP | PO2016-163244 | 9/2016 |

OTHER PUBLICATIONS

DPM, Office Action for related German Patent Application No. 10 2018 132 408.1, Jul. 6, 2023, 6 pages.

* cited by examiner

900

Example class (c++):

```
class double_with_error{
public:
        double value;
        double precision;
        double_with_error(double val, double prec){
                this->value = val;
                 this-> error = prec;
        }
        double_with_error  operator+=(double_with_error obj){
                this->value + obj.value;// calculate sensor value
                this-> precision  + obj. precision; // propagate precision
                return *this;
        }
        double_with_error  operator+(double_with_error obj){
                double_with_error tmp(this->value+obj.value, this-> precision +obj. precision);
                 return tmp;
        }
        ….
}
```

Figure 9

QUALITY OF SERVICE FOR A VEHICULAR PLUG-AND-PLAY ECOSYSTEM

BACKGROUND

The specification relates to providing improved quality of service for a vehicular plug-and-play ecosystem.

Vehicle control systems are becoming increasingly popular. One example of a vehicle control system is an Advanced Driver Assistance System ("ADAS system" if singular, "ADAS systems" if plural).

ADAS systems provide one or more autonomous features to the vehicles which include these ADAS systems. For example, an ADAS system may monitor the position of a vehicle relative to the lane in which the vehicle is traveling, and if the vehicle begins to swerve outside of that lane the ADAS system may take remedial action by repositioning the vehicle so that the vehicle stays in the lane or providing a notification to a driver of the vehicle so that the driver knows that they need to take action to remedy the situation.

Some vehicles include a sufficient number and quality of autonomous features that they are considered to be autonomous vehicles.

SUMMARY

A vehicular plug-and-play ecosystem is desirable to automobile manufactures. For example, an automobile manufacturer wants their vehicles to have an infrastructure which will enable software developers to write software applications for their vehicles (i.e., "vehicular applications") and then have those vehicular applications work the same, or substantially the same, on different makes and models of their vehicles. This is not currently possible using existing solutions. For example, software for an ADAS system (herein, "ADAS software," which is an example of a vehicular application) will operate different for "Vehicle X" relative to "Vehicle Y" if Vehicle X and Vehicle Y have a different make and model, even if Vehicle X and Vehicle Y have the same manufacturer. A vehicular plug-and-play ecosystem solves this problem, for example, by enabling the ADAS software to operate in a similar way regardless of the make and model of the vehicle in which the ADAS software is installed.

One obstacle to providing a vehicular plug-and-play ecosystem is that the existing solutions do not provide a means for providing the Quality of Service (herein, "QoS") which is required to achieve a true vehicular plug-and-play ecosystem. For vehicular applications, QoS refers to improving the precision of the sensor measurements measured by the onboard sensors of the vehicle. For example, ADAS software operates different on vehicles having different makes and models because the discrete onboard sensors of these vehicles have different and varying error rates for different conditions such as their respective times of service and environmental factors.

Described herein are embodiments of a: (1) a QoS system; and (2) a QoS architecture for designing vehicle sensors that are operable to cooperate with the QoS system. A vehicle sensor whose design is consistent with the QoS architecture includes a non-transitory memory storing a data structure (e.g., a QoS table) and a communication interface that is operable to provide the data structure to the QoS system. See, e.g., the vehicle sensor 150 depicted in FIG. 1. The QoS system is an element of an onboard vehicle computer (e.g., an electronic control unit, herein, "ECU") or some other processor-based onboard system of a vehicle. The QoS system uses the QoS table, as well as digital data that describes the environmental conditions of the vehicle sensor, to increase the precision of the sensor measurements provided by the vehicle sensor. In this way, the embodiments described herein provide a uniform (or substantially uniform) quality of service for all vehicles which include both the vehicle sensor (whose design is consistent with the sensor architecture) and the QoS system. This quality of service is uniform, regardless of the make and model of the vehicle, such that a plug-and-play ecosystem can be implemented for all vehicles manufactured by a particular automobile manufacturer. Additionally, the embodiments described herein will reduce the number of physical measurements that are needed, and thereby decrease the total cost of development for vehicles in general, and vehicle sensors in particular.

In some embodiments, the QoS table is a data structure that includes digital data describing: (1) different combinations of environmental conditions in which a vehicle sensor may have to operate [e.g., various degrees of environmental variables such as illumination, temperature, wetness, etc. combined in various combinations such as dark/cold/wet and bright/hot/dry]; and (2) a QoS value for this particular vehicle sensor when it operates in the different combinations of environmental conditions. Each QoS value of the QoS table is associated with a different combination of environmental conditions.

In some embodiments, each particular vehicle sensor is analyzed after it is manufactured to determine its particular QoS values such that a particular QoS table is personalized for the particular vehicle sensor that stores the particular QoS table. For example, assume a factory produces several varieties of vehicle sensors. The phrase "personalized for the particular vehicle sensor" as used here does not mean that each variety of vehicle sensor has its own QoS table. Instead, the phrase "personalized for the particular vehicle sensor" as used here means that each individual vehicle sensor, regardless of its variety, is tested to determine different QoS values for this individual vehicle sensor when it operates under different environmental conditions, and that each individual vehicle sensor includes a QoS table that is personalized for it because the QoS table includes its particular QoS values. In some embodiments, each QoS table is unique because it includes QoS values that are unique to a particular vehicle sensor.

In some embodiments, the QoS value is a factor which corrects for the error rate of the vehicle sensor when it operates in the combination of environmental conditions which is associated with the QoS value, thereby improving the effective sensor measurement of the sensor. In some embodiments, each of the vehicle sensors of the vehicle will include a QoS table which is determined for each vehicle at its time of manufacture based on quality control testing which is performed before the sensor leaves the factory.

In some embodiments, a QoS system includes code and routines installed in an onboard vehicle computer system that is operable, when executed by the onboard vehicle computer system, to cause the onboard vehicle computer system to execute one or more of the following steps: receiving the QoS table from a particular vehicle sensor; receiving environmental data that describes the environmental conditions of the particular vehicle sensor; and determining a QoS value for the particular vehicle sensor based on the QoS table and the environmental data. An onboard vehicular application, such as an ADAS system, uses sensor measurements from the particular vehicle sensor to provide its functionality. The particular vehicle sensor provides particular sensor data that describes the raw, unmodified sensor measurements of the particular vehicle sensor. The QoS value can be used to generate a corrected sensor measurement that is more accurate than the raw, unmodified sensor measurements. Architecturally, the QoS system operates between the onboard vehicular application and the particular vehicle sensor. As described above, the QoS system determines the QoS value for the particular vehicle sensor. In some embodiments, the QoS system either: determines the corrected sensor measurement based on the QoS value and provides the corrected sensor measurement to the onboard vehicular system; or provides both the QoS value and the raw, unmodified sensor measurement to the onboard vehicular system so that the onboard vehicular system can determine the corrected sensor measurement itself.

In some embodiments, architecturally, the QoS system operates between each vehicular application and the particular vehicle sensor. At runtime, the QoS system includes code and routines that are operable, when executed by the onboard vehicle computer that includes the QoS system, to cause the onboard vehicle computer to execute one or more of the following steps: (1) monitoring the current combination environmental conditions in which the vehicle is presently operating to receive environmental data; (2) retrieving the QoS table for each vehicle sensor; (3) receiving a request from a vehicular application [e.g., an ADAS system] for a particular sensor measurement provided by a particular vehicle sensor; (4) querying the QoS table for the particular vehicle sensor with environmental data describing the current combination of environmental conditions to retrieve a QoS value for this particular vehicle sensor while it is operating in the current combination of environmental conditions; (5) querying the particular vehicle sensor to receive the particular sensor measurement; (6) applying the QoS value to the particular sensor measurement to generate a corrected sensor measurement; and (7) providing the corrected sensor measurement to the vehicular application in response to the request received at step (3).

In some embodiments, the QoS system, the vehicle sensor whose design is consistent with the QoS architecture and the vehicular application are elements of an autonomous vehicle. The National Highway Traffic Safety Administration ("NHTSA") has defined different "levels" of autonomous vehicles, e.g., Level 0, Level 1, Level 2, Level 3, Level 4 and Level 5. If a vehicle has a higher-level number than another vehicle (e.g., Level 3 is a higher-level number than Levels 2 or 1), then the vehicle with a higher-level number offers a greater combination and quantity of autonomous features relative to the vehicle with the lower level number. The different levels of autonomous vehicles are described briefly below.

Level 0: The set of ADAS systems installed in the vehicle have no vehicle control, but may issue warnings to the driver of the vehicle.

Level 1: The driver must be ready to take control of the vehicle at any time. The set of ADAS systems installed in the vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the vehicle fail to respond properly (based on the driver's subjective judgement). The set of ADAS systems installed in the vehicle executes accelerating, braking, and steering. The set of ADAS systems installed in the vehicle can deactivate immediately upon takeover by the driver.

Level 3: Within known, limited environments (such as freeways), the driver can safely turn their attention away from driving tasks, but must still be prepared to take control of the vehicle when needed.

Level 4: The set of ADAS systems installed in the vehicle can control the vehicle in all but a few environments such as severe weather. The driver must enable the automated system (which is comprised of the set of ADAS systems installed in the vehicle) only when it is safe to do so. When the automated system is enabled, driver attention is not required for the vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

In some embodiments, the vehicle is a Highly Autonomous Vehicle ("HAV" if singular, or "HAVs" if plural). An HAV is a vehicle (e.g., the DSRC-enabled ego vehicle) that includes a set of ADAS systems that operate at Level 3 or higher as described above, or as defined by the NHTSA on page 9 of their policy paper entitled "Federal Automated Vehicles Policy: Accelerating the Next Revolution in Roadway Safety," which was published in September of 2016.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a vehicle sensor operable to provide a sensor measurement, where the vehicle sensor includes a non-transitory memory that stores a data structure, where the data structure stores digital data that describes: an environmental condition; and a quality of service value for the vehicle sensor when it operates in the environmental condition, where the quality of service value is a factor that corrects the sensor measurement of the vehicle sensor when it operates in the environmental condition. Other embodiments of this aspect include corresponding computer systems, apparatus, and computer programs recorded on one or more computer storage devices, each configured to perform the actions of the methods.

One general aspect includes a method including: receiving environment data describing an environmental condition of a vehicle sensor, determining a quality of service value for the vehicle sensor based on the environment data, and determining a corrected sensor measurement for the vehicle sensor based on the quality of service value. Other embodiments of this aspect include corresponding computer systems, apparatus, and computer programs recorded on one or more computer storage devices, each configured to perform the actions of the methods.

Implementations may include one or more of the following features. The method where the quality of service value is determined based on a quality of service table which is stored in the vehicle sensor. The method where the quality of service table is generated for the vehicle sensor when the vehicle sensor is manufactured. The method where the quality of service value is a factor. The method where the quality of service value is not a factor. The method where the method is executed by an electronic control unit. The method where the electronic control unit is an element of a vehicle. The method where vehicle is a highly autonomous vehicle. The method where the method is not executed by an electronic control unit. The method further including providing the corrected sensor measurement to an advanced driver assistance system. The method where the advanced driver assistance system is an element of a vehicle which renders the vehicle a highly autonomous vehicle. Implementations of the described techniques may include hardware, a method or process, or computer software on a computer-accessible medium.

One general aspect includes a computer program product including a non-transitory memory of a vehicle that stores computer code that is operable, when executed by an onboard vehicle computer of the vehicle, to cause the onboard vehicle computer to execute steps including: receiving environment data describing an environmental condition of a vehicle sensor; determining a quality of service value for the vehicle sensor based on the environment data; and determining a corrected sensor measurement for the vehicle sensor based on the quality of service value. Other embodiments of this aspect include corresponding computer systems, apparatus, and computer programs recorded on one or more computer storage devices, each configured to perform the actions of the methods.

Implementations may include one or more of the following features. The computer program product where the quality of service value is determined based on a quality of service table which is stored in the vehicle sensor. The computer program product where the quality of service table is generated for the vehicle sensor when the vehicle sensor is manufactured. The computer program product where the quality of service value is a factor. The computer program product where the quality of service value is not a factor. The computer program product where the onboard vehicle computer is an electronic control unit. The computer program product where vehicle is a highly autonomous vehicle. The computer program product where the non-transitory memory stores additional computer code that is operable, when executed by the onboard vehicle computer, to cause the onboard vehicle computer to execute an additional step including providing the corrected sensor measurement to an advanced driver assistance system of the vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 9 is a block diagram illustrating an example of pseudo code for the QoS system according to some embodiments.

DETAILED DESCRIPTION

Figure 1:
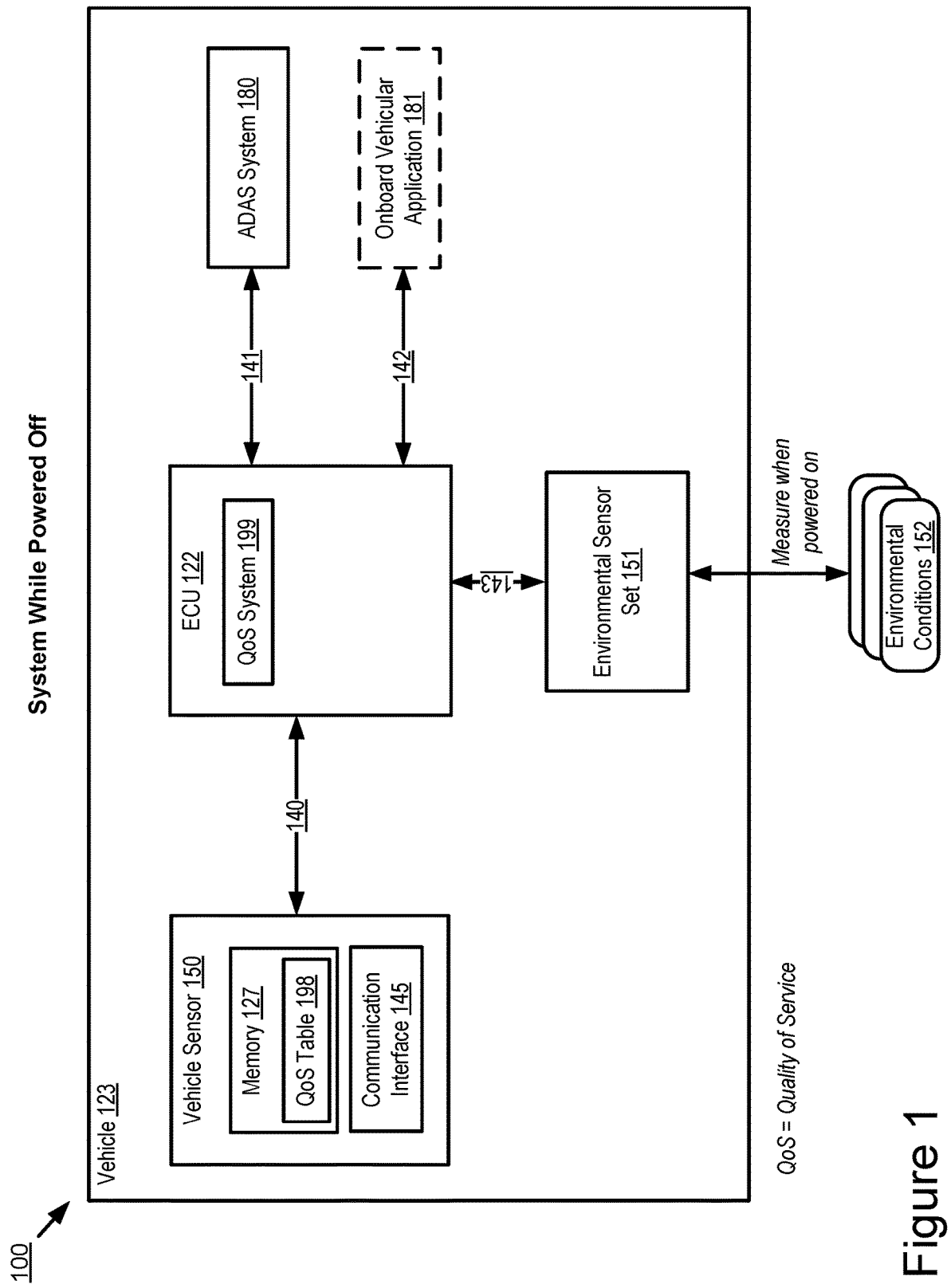
FIG. 1 is a block diagram illustrating an operating environment for a QoS system and a vehicle sensor built based on the QoS architecture according to some embodiments.

Referring to FIG. 1, depicted is a block diagram illustrating an operating environment 100 for a QoS system 199 and a vehicle sensor 150 built based on the QoS architecture according to some embodiments. As depicted, the operating environment 100 includes a vehicle 123 with the following elements: a vehicle sensor 150; an electronic control unit 122 ("ECU 122"); an environmental sensor set 151; an ADAS system 180. In some embodiments, the vehicle 123 includes an onboard vehicular application 181. The onboard vehicular application 181 is depicted with a dashed line in FIG. 1 to indicate that it is an optional element of the operating environment 100. In some embodiments, the ADAS system 180 is an example of a specific type of onboard vehicular application 181.

The vehicle 123 is a roadway-based conveyance. For example, the vehicle 123 is one of the following types of conveyance: a car; a truck; a sports utility vehicle; a bus; a semi-truck; a drone or any other roadway-based conveyance.

Figure 2:
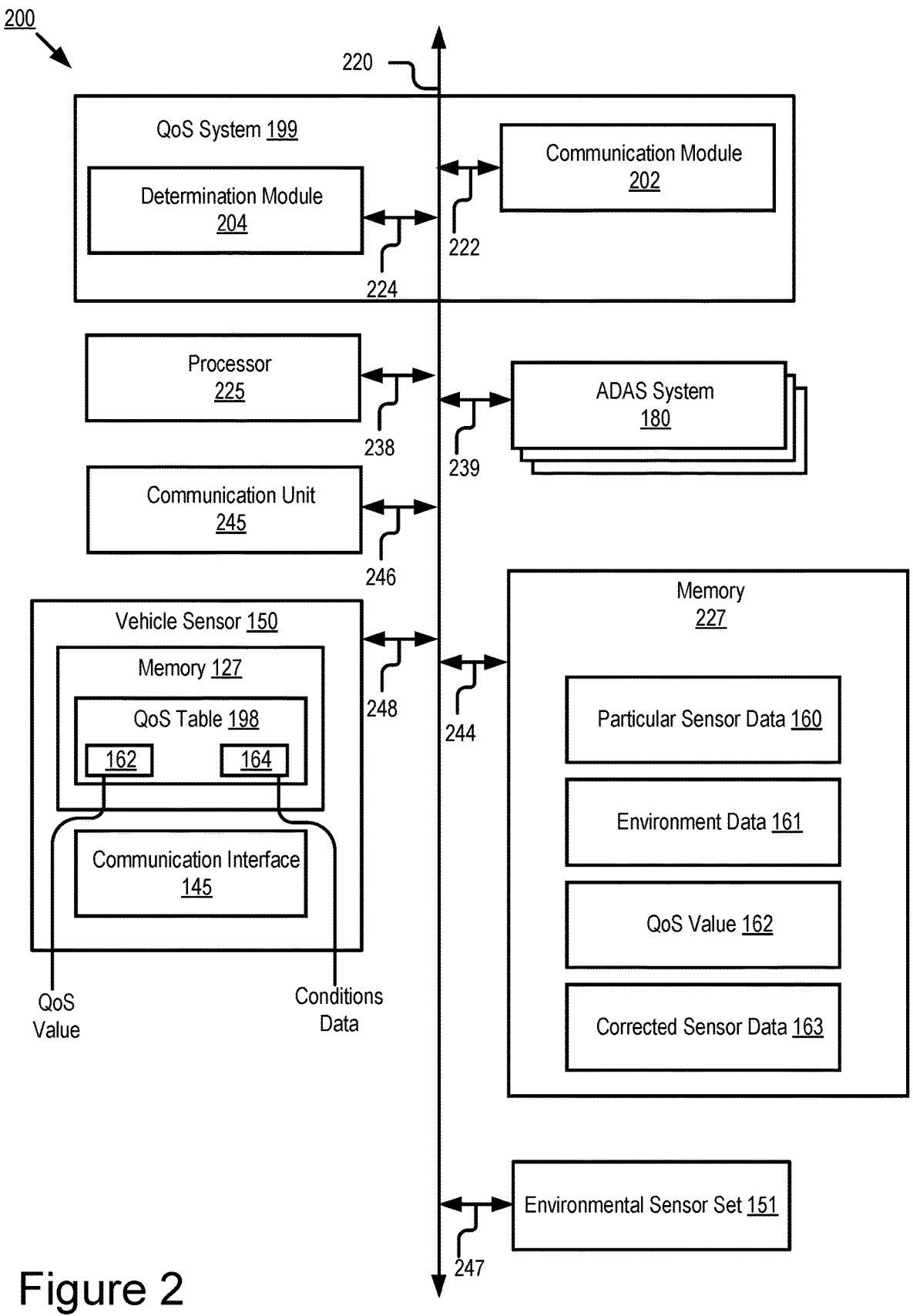
FIG. 2 is a block diagram illustrating an example computer system including the QoS system and the vehicle sensor according to some embodiments.

In some embodiments, the vehicle 123 is an autonomous vehicle. For example, the vehicle 123 is one of the following: a Level 1 autonomous vehicle; a Level 2 autonomous vehicle; a Level 3 autonomous vehicle; a Level 4 autonomous vehicle; and a Level 5 autonomous vehicle. In some embodiments, the vehicle 123 is an HAV. An HAV is an autonomous vehicle whose set of ADAS systems 180 provides autonomous functionality sufficient to operate at Level 3 or greater. An example of an onboard vehicle computer for the vehicle 123 is depicted in FIG. 2 according to some embodiments.

The vehicle sensor 150 is a vehicular sensor whose design is compliant with the QoS architecture. For example, the vehicle sensor 150 includes: (1) a memory 127 that stores a QoS table 198 which is personalized for the vehicle sensor 150; and (2) a communication interface 145 that is operable to provide the QoS table 198 to the QoS system 199.

In some embodiments, the vehicle sensor 150 may include one or more of the following vehicle sensors whose design is compliant with the QoS architecture: an external microphone; an internal microphone; an external camera; an internal camera; a LIDAR sensor; a laser-based range finder; a laser altimeter; one or more stereoscopic cameras; a navigation sensor (e.g., a global positioning system); an infrared detector; a motion detector; an accelerometer; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The vehicle sensor 150 includes a memory 127 and a communication interface 145.

The memory 127 is a non-transitory storage medium that stores instructions or data that may accessed and executed by an onboard vehicle computer of the vehicle 123 such as the ECU 122. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM).

The memory 127 stores a QoS table 198. The QoS table 198 is a data structure that includes digital data describing: (1) different combinations of environmental conditions 152 in which a vehicle sensor 150 may have to operate; and (2) a QoS value for this particular vehicle sensor 150 when it operates in the different combinations of environmental conditions 152. Each QoS value of the QoS table 198 is associated with a different combination of environmental conditions 152.

In some embodiments, the QoS table 198 describes a plurality of environmental conditions 152 and a plurality QoS values that each correspond to one of the plurality of environmental conditions 152.

In some embodiments, the QoS table 198 includes, for example, (1) a first column having a plurality of cells and each cell of the first column describes a combination of environmental conditions 152 and (2) a second column associated with the first column and neighboring the first column, with the second column having a plurality of cells and each cell of the second column describes a QoS value for the environmental conditions 152 included in the neighboring cell of the first column.

The environmental conditions 152 include, for example, various degrees of environmental variables such as illumination, temperature, wetness, etc. combined in various combinations such as dark/cold/wet and bright/hot/dry. The environmental sensor set 151 includes one or more sensors that measure the environmental conditions 152. For example, the environmental sensor set 151 includes a light sensor to measure the illumination, a thermometer to measure the temperature, and a humidistat to measure the moisture present in the air. The environmental sensor set 151 measures the environmental conditions 152 and records these measurements as environment data. The environment data is digital data that describes the measurements of the environmental conditions 152 recorded by the environmental sensor set 151. See, e.g., the environment data 161 depicted in FIGS. 2-6, 8 and 10.

The communication interface 145 is an electronic interface that is operable to retrieve digital data from the memory 127 and transmit digital data from the vehicle sensor 150 to the ECU 122. In some embodiments, the communication interface 145 includes a port for direct physical connection to the ECU 122. For example, the communication interface 145 includes a universal serial bus (USB), secure digital (SD), CAT-5, or similar port for wired communication with the ECU 122.

In some embodiments, the communication interface 145 includes a wireless transceiver for exchanging data with the ECU 122 using one or more wireless communication methods, including one or more of the following: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; and another suitable wireless communication method.

In some embodiments, the communication interface 145 includes a full-duplex coordination system as described in U.S. patent application Ser. No. 14/471,387 filed on Aug. 28, 2014 and entitled "Full-Duplex Coordination System."

In some embodiments, the communication interface 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication interface 145 includes a wired port and a wireless transceiver. The communication interface 145 also provides other conventional connections to one or more wireless networks (e.g. an in-vehicle wireless network) for distribution of files or media objects using standard network protocols including TCP/IP, HTTP, HTTPS, and SMTP, millimeter wave, DSRC, etc.

In some embodiments, the vehicle sensor 150 transmits the QoS table 198, as well as digital data that describes the raw sensor measurements of the vehicle sensor 150 (e.g., the particular sensor data 160 depicted in FIG. 2), to the ECU 122 via the communication interface 145. In some embodiments, the communication interface 145 is operable to automatically transmit the QoS table 198 to the QoS system 199 responsive to the vehicle 123 being powered on (e.g., the ignition of the vehicle 123 is keyed on). In some embodiments, one or more of the environmental sensors included in the environmental sensor set 151 include a communication interface 145.

The ECU 122 is an onboard vehicle computer of the vehicle 123. The ECU 122 includes the QoS system 199. The QoS system 199 includes code and routines that are operable, when executed by the ECU 122, to cause the ECU 122 to execute one or more steps including: (1) monitoring the current combination environmental conditions 152 in which the vehicle 123 is presently operating to receive environmental data; (2) retrieving the QoS table 198 for each vehicle sensor 150; (3) receiving a request from an onboard vehicular application 181 [e.g., an ADAS system 180] for a particular sensor measurement provided by a particular vehicle sensor 150; (4) querying the QoS table 198 for the particular vehicle sensor 150 with environmental data describing the current combination of environmental conditions 152 to retrieve a QoS value for this particular vehicle sensor 150 while it is operating in the current combination of environmental conditions 152; (5) querying the particular vehicle sensor 150 to receive the particular sensor measurement; (6) applying the QoS value to the particular sensor measurement to generate a corrected sensor measurement; and (7) providing the corrected sensor measurement to the onboard vehicular application 181 [e.g., the ADAS system 180] in response to the request received at step (3).

In some embodiments, the QoS system 199 of the is implemented using hardware including a field-programmable gate array ("FPGA") or an application-specific integrated circuit ("ASIC"). In some other embodiments, the QoS system 199 is implemented using a combination of hardware and software. The QoS system 199 may be stored in a combination of the devices (e.g., one or more ECUs 122), or in one of the devices. Additional elements of the QoS system 199 are depicted in FIG. 2 according to some embodiments.

The onboard vehicular application 181 are any onboard systems of the vehicle 123 that uses sensor measurements of the vehicle sensor 150 to provide its functionality. The ADAS system 180 is an example of an onboard vehicular application 181 according to some embodiments.

Examples of an ADAS system 180 one or more of the following: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems 180 are also referred to herein as an "autonomous feature" or an "autonomous functionality," respectively.

In some embodiments, the autonomous features and autonomous functionality provided by the ADAS system 180 are sufficient to classify the vehicle 123 as one or more of the following: a Level 1 autonomous vehicle; a Level 2 autonomous vehicle; a Level 3 autonomous vehicle; a Level 4 autonomous vehicle; and a Level 5 autonomous vehicle. In some embodiments, the vehicle 123 is an HAV. An HAV is an autonomous vehicle whose ADAS system 180 provides autonomous functionality sufficient to operate at Level 3 or greater. An example of an onboard vehicle computer for the vehicle 123 is depicted in FIG. 2 according to some embodiments. In some embodiments, FIG. 2 depicts an ECU 122 of the vehicle 123.

In some embodiments, the ADAS system 180 uses the one or more sensor measurements of the vehicle sensor 150 to provide its functionality. The QoS system 199 improves the performance of the ADAS system 180 by providing corrected sensor measurements that are more accurate than the raw, unmodified sensor measurements recorded by the vehicle sensor 150. For example, the QoS system 199 determines of QoS value using the QoS table 198 and environmental data received from the environmental sensor set 151. The QoS system 199 uses these inputs to determine a QoS value from the QoS table 198. The QoS value is a factor which is used to correct the raw sensor measurements of the vehicle sensor 150, and thereby generate the corrected sensor measurement.

As depicted, the vehicle sensor 150 is communicatively coupled to the ECU 122 via a signal line 140. The ADAS system 180 is communicatively coupled to the ECU 122 via a signal line 141. The onboard vehicular application 181 is communicatively coupled to the ECU 122 via a signal line 142. The environmental sensor set 151 is communicatively coupled to the ECU 122 via a signal line 143.

Referring now to FIG. 2, depicted is a block diagram illustrating an example computer system 200 including the QoS system and the vehicle sensor according to some embodiments.

In some embodiments, the computer system 200 is a special-purpose computer system that is programmed to perform one or more steps of a method 1200 described below with reference to FIG. 12.

In some embodiments, the computer system 200 is onboard vehicle computer of the vehicle 123. For example, the computer system 200 is the ECU 122.

In some embodiments, the computer system 200 is an onboard unit, ECU, head unit or some other processor-based computing device of the vehicle 123.

The computer system 200 may include one or more of the following elements according to some examples: the QoS system 199; the processor 225; the memory 227; the communication unit 245; the vehicle sensor 150; the environmental sensor set 151; and one or more ADAS systems 180. These components of the computer system 200 are communicatively coupled by the bus 220.

In the illustrated embodiment, the processor 225 is communicatively coupled to the bus 220 via a signal line 238. The memory 227 is communicatively coupled to the bus 220 via a signal line 244. The communication unit 245 is communicatively coupled to the bus 220 via a signal line 246. The vehicle sensor 150 is communicatively coupled to the bus 220 via a signal line 248. The environmental sensor set 151 is communicatively coupled to the bus 220 via a signal line 247. The one or more ADAS systems 180 are communicatively coupled to the bus 220 via a signal line 239.

These elements of the computer system 200 where described above with reference to FIG. 1, and their descriptions will not be repeated here: the QoS system 199; vehicle sensor 150; the ADAS system 180; and the environmental sensor set 151.

As depicted, the QoS table 198 includes: (1) conditions data 164; and (2) one or more QoS values 162. The conditions data 164 is digital data that describes one or more combinations of environmental conditions in which the vehicle sensor 150 may operate. Each of the one or more combinations of environmental conditions is assigned its own QoS value 162. The QoS value 162 is digital data that describes a factor which is used to correct the raw sensor measurements recorded by the vehicle sensor 150 to generate a corrected sensor measurement. The raw sensor measurements of the vehicle sensor 150 are described by the particular sensor data 160. The corrected sensor measurement is described by the corrected sensor data 163. The environment data 161 is digital data that describes measurements of the environmental sensor set 151 that describe the current environmental conditions in which the vehicle sensor 150 is operating.

In some embodiments, the QoS system 199 receives the QoS table 198 and the environment data 161. The QoS system 199 queries the QoS table 198 using the environment data 161 to find an instance of conditions data 164 which matches or substantially matches the environment data 161. The conditions data 164 which matches or substantially matches the environment data 161 is associated with a particular QoS value 162, and the QoS system 199 selects this particular QoS value 162 as a factor which is used to correct the sensor measurements that are generated by the vehicle sensor 150 and described by the particular sensor data 160. The QoS system 199 generates corrected sensor data 163 based on the particular sensor data 160 and the QoS value 162 which corresponds to the current environment data 161. The corrected sensor measurement described by the corrected sensor data 163 is more accurate than the raw, unmodified sensor measurement described by the particular sensor data 160 because it is corrected for the environmental conditions in which the vehicle sensor 150 is operating.

The communication unit 245 provides the same functionality as the communication interface 145 described above with reference to FIG. 1, and so, that description will not be repeated here. For example, the communication unit 245 enables the computer system 200 to communicate with the other elements of the operating environment 100.

In some embodiments, the computer system 200 communicates with the vehicle sensor 150 using the communication unit 245. For example, the communication interface 145 transmits the QoS table 198 and the particular sensor data 160 to communication unit 245 and the QoS system 199 receives the QoS table 198 and the particular sensor data 160 from the communication unit 245.

The processor 225 includes an arithmetic logic unit, a microprocessor, a general-purpose controller, or some other processor array to perform computations and provide electronic signals necessary to provide the functionality of the computer system 200. The processor 225 processes data signals and may include various computing architectures including a complex instruction set computer (CISC) architecture, a reduced instruction set computer (RISC) architecture, or an architecture implementing a combination of instruction sets. The computer system 200 may include one or more processors 225. Other processors, operating systems, sensors, displays, and physical configurations may be possible. In some embodiments, the one or more processors 225 are an element of an onboard vehicle computer or electronic control unit of the computer system 200.

The memory 227 is a non-transitory storage medium that stores instructions or data that may accessed and executed by the processor 225. The instructions or data may include code for performing the techniques described herein. The memory 227 may be a DRAM device, a SRAM device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 227 may be reserved for use as a buffer or virtual RAM. The computer system 200 may include one or more memories 227.

The memory 227 stores one or more of the following types of digital data: the particular sensor data 160; the environment data 161; the QoS value 162; and the corrected sensor data 163. Each of these types of digital data are described above, and those descriptions will not be repeated here.

In some embodiments, the memory 227 stores any of the data, information or messages described herein. The memory 227 may store any data needed for the computer system 200 to provide its functionality.

In the illustrated embodiment shown in FIG. 2, the QoS system 199 includes a communication module 202 and a determination module 204.

The communication module 202 can be software including routines for handling communications between the QoS system 199 and other components of the computer system 200. In some embodiments, the communication module 202 can be a set of instructions executable by the processor 225 to provide the functionality described below for handling communications between the QoS system 199 and other components of the computer system 200.

The communication module 202 sends and receives data, via the communication unit 245, to and from one or more elements of the operating environment 100 (see, e.g., FIG. 1). For example, the communication module 202 receives or transmits, via the communication unit 245, any of the data stored in the memory 227 or messages described herein. The communication module 202 may send or receive any of the data or messages described herein via the communication unit 245.

In some embodiments, the communication module 202 receives one or more messages from the communication unit 245 that includes the QoS table 198 and the particular sensor data 160. The communication module 202 stores the QoS table 198 and the particular sensor data 160 in the memory 227 (or a buffer or cache of the computer system 200.

In some embodiments, the communication module 202 may handle communications between components of the QoS system 199.

In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

Figure 12:
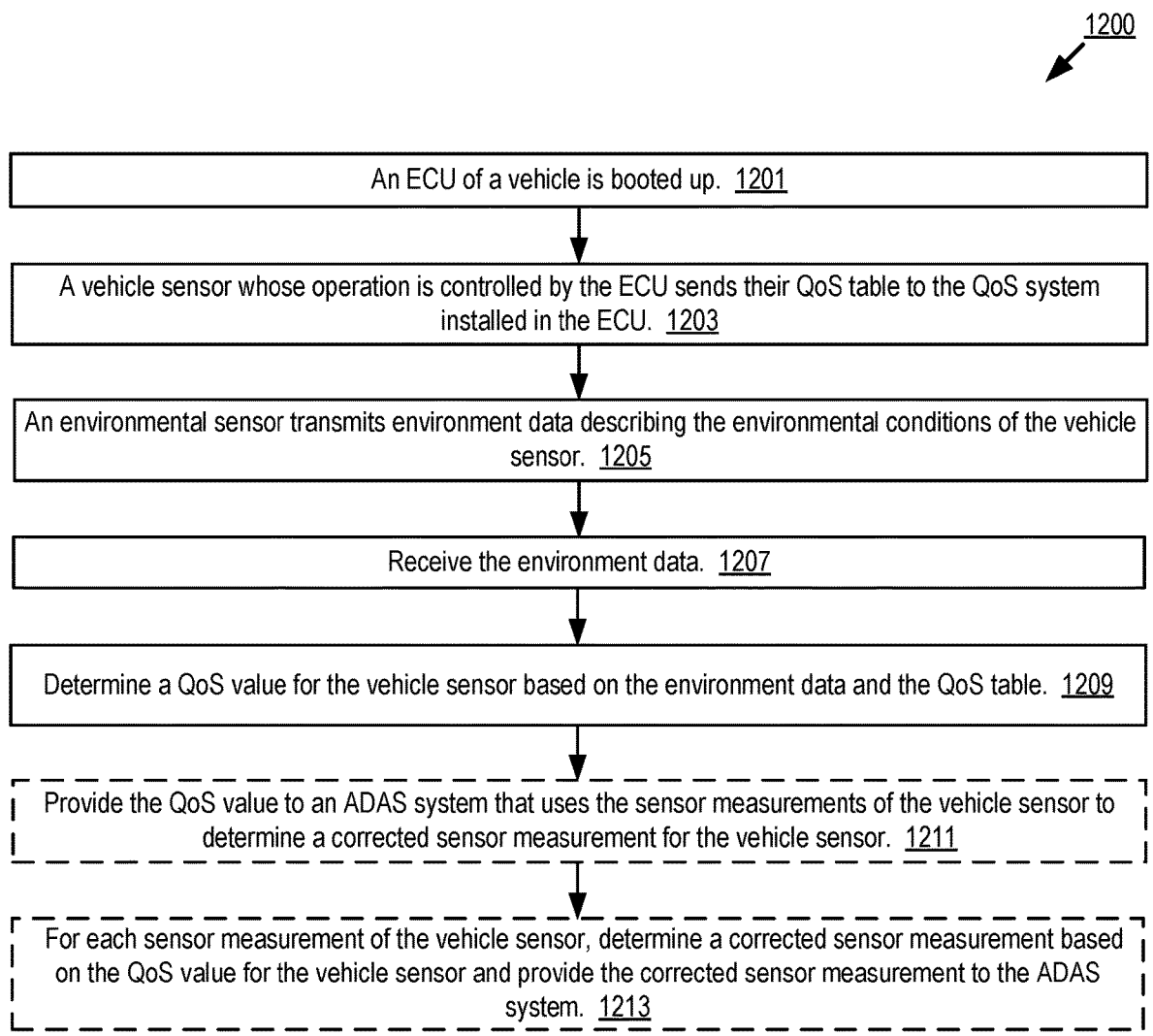
FIG. 12 is an example flow diagram of a method for generating corrected sensor data according to some embodiments.

The determination module 204 can be software including routines for executing one or more steps of the method 1200 depicted in FIG. 12. In some embodiments, the determination can be software including routines for executing one or more of the following steps: (1) monitoring the current combination environmental conditions 152 in which the vehicle sensor 150 is presently operating to receive environment data 161 which describes these environmental conditions 152; (2) retrieving the QoS table 198 for each vehicle sensor 150 included in the computer system 200; (3) receiving a request from a vehicular application [e.g., an ADAS system 180] for a particular sensor measurement provided by a particular vehicle sensor 150; (4) querying the QoS table 198 for the particular vehicle sensor 150 with environmental data 161 describing the current combination of environmental conditions 152 to retrieve a QoS value 162 for this particular vehicle sensor 150 while it is operating in the current combination of environmental conditions 152; (5) querying the particular vehicle sensor 150 to receive the particular sensor measurement which is described by the particular sensor data 160; (6) applying the QoS value 162 to the particular sensor measurement to generate a corrected sensor measurement which is described by the corrected sensor data 163; and (7) providing the corrected sensor measurement to the ADAS system 180 in response to the request received at step (3).

In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

Figure 3:
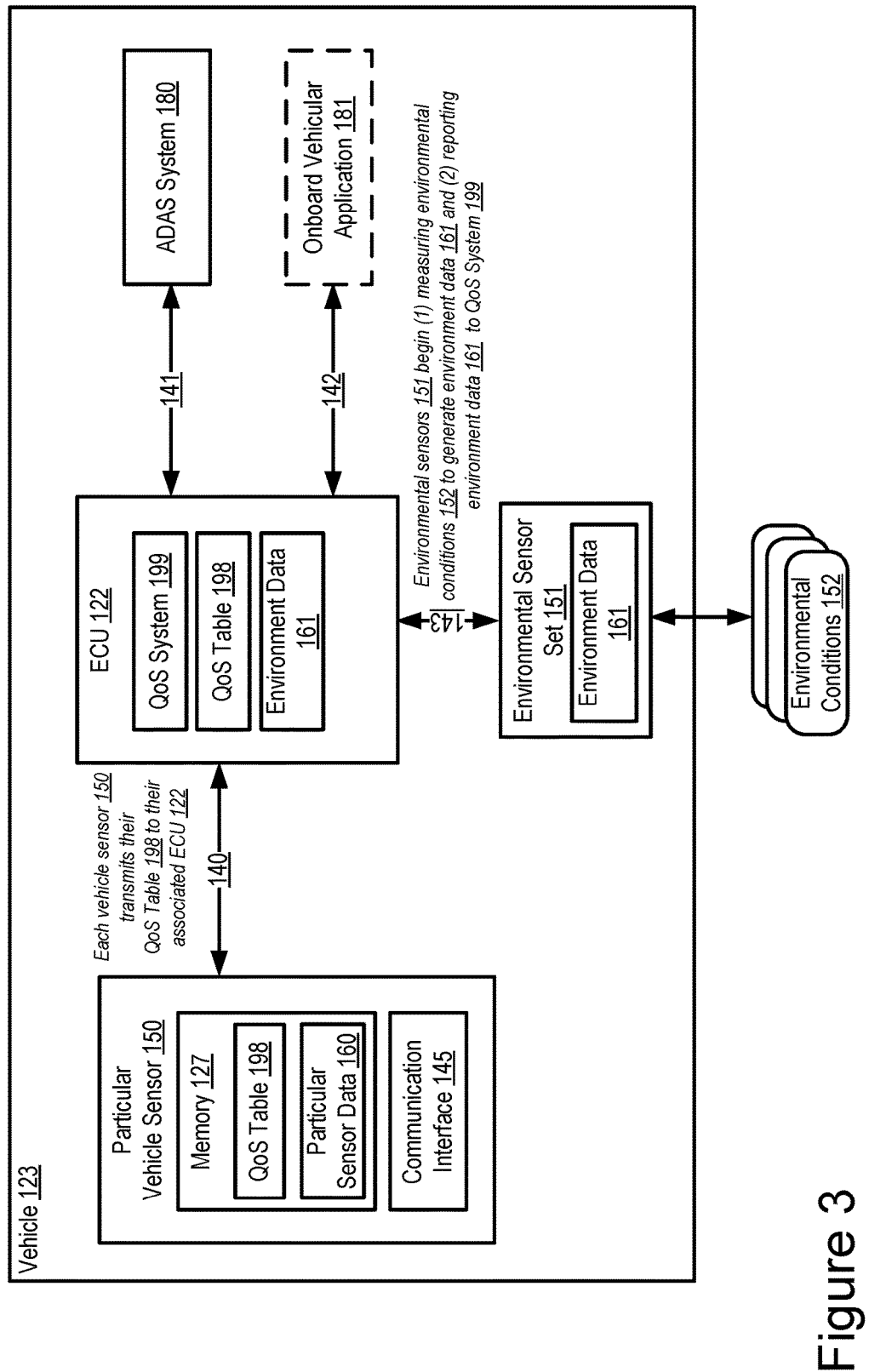
FIG. 3 is a block diagram illustrating a process flow for the QoS system after a vehicle is powered on according to some embodiments.

Referring now to FIG. 3, depicted is a block diagram illustrating a process flow 300 for the QoS system 199 after a vehicle 123 is powered on according to some embodiments. The process flow 300 of FIG. 3 includes elements that are similar to those described above for the operating environment 100 of FIG. 1, and so, those descriptions will not be repeated.

As depicted, the process flow 300 occurs after the vehicle 123 is powered on. For example, the vehicle 123 is keyed on. The QoS system 199 requests the QoS table 198 from the particular vehicle sensor 150. The communication interface 145 transmits the QoS table 198 to the QoS system 199, which is then stored in a non-transitory memory of the ECU 122 (e.g., the memory 227 described above with reference to FIG. 2). The QoS system 199 causes the environmental sensor set 151 to record environment data 161 that describes the environmental conditions 152. The environmental sensor set 151 transmits the environment data 161 to the QoS system 199. The environment data 161 is stored in the non-transitory memory of the ECU 122.

Figure 4:
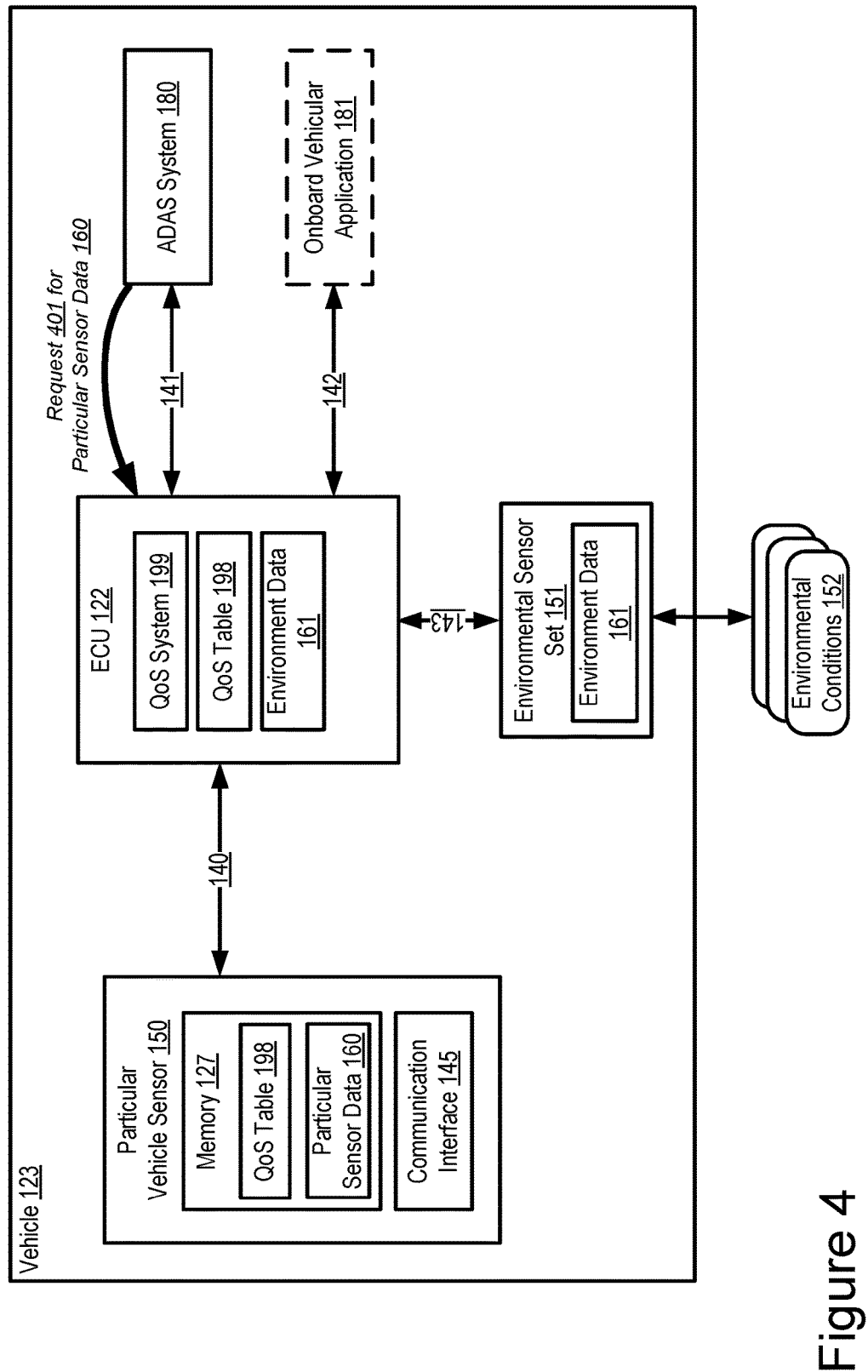
FIG. 4 is a block diagram illustrating a process flow for the QoS system to receive a request for particular sensor data according to some embodiments.

Referring now to FIG. 4, depicted is a block diagram illustrating a process flow 400 for the QoS system 199 to receive a request 401 for particular sensor data 160 according to some embodiments. The process flow 400 of FIG. 4 includes elements that are similar to those described above for the operating environment 100 of FIG. 1, and so, those descriptions will not be repeated.

The ADAS system 180 transmits the request 401 to the QoS system 199. The QoS system 199 receives the request 401. For example, the communication unit 245 described above with reference to FIG. 2 receives the request 401.

Figure 5:
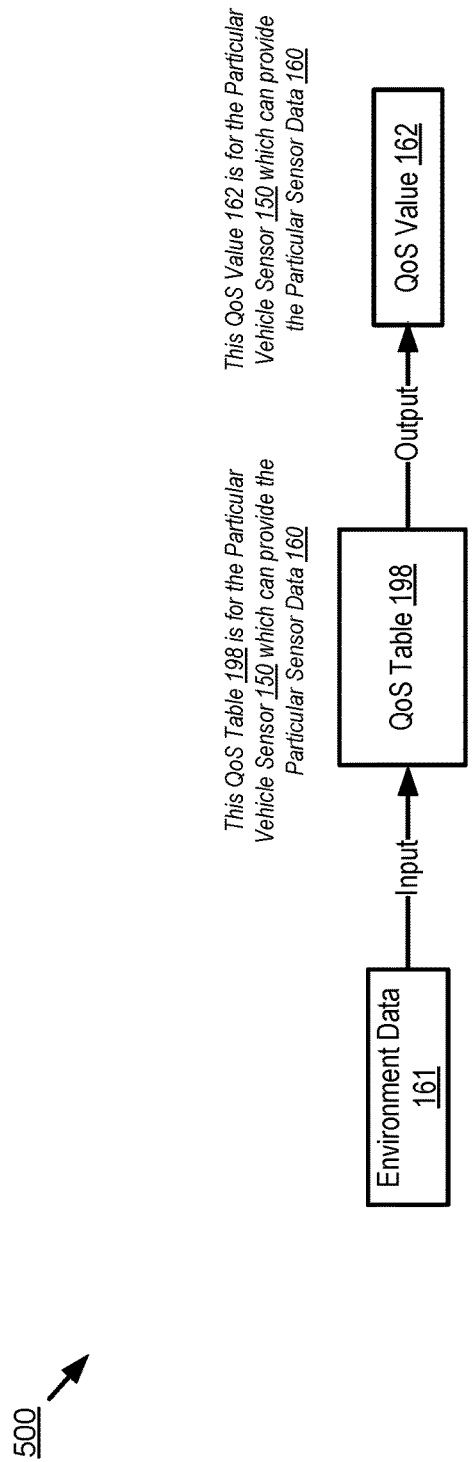
FIG. 5 is a block diagram illustrating a process flow for the QoS system to determine a QoS value for a particular vehicle sensor based on environment data and the QoS table for the particular vehicle sensor according to some embodiments.

Referring now to FIG. 5, depicted is a block diagram illustrating a process flow 500 for the QoS system 199 to determine a QoS value 162 for a particular vehicle sensor 150 based on environment data 161 and the QoS table 198 for the particular vehicle sensor 150 according to some embodiments. The process flow 500 of FIG. 5 includes elements that are similar to those described above for the operating environment 100 of FIG. 1, and so, those descriptions will not be repeated.

The QoS table 198 receives the environment data 161 as an input. The environment data 161 may be same as the environment data 161 which is generated when the vehicle 123 is powered on as depicted in FIG. 3. In other words, the environment data 161 describes the current environmental conditions 152 in which the particular vehicle sensor 150 is presently operating. The QoS table 198 outputs the QoS value 162 based on the environment data 161 which is received as an input during the process flow 500.

For example, the QoS table 198 includes: (1) conditions data 164; and (2) one or more QoS values 162. Each of the one or more combinations of environmental conditions is assigned its own QoS value 162. The QoS system 199 queries the QoS table 198 using the environment data 161 to find an instance of conditions data 164 which matches or substantially matches the environment data 161. The conditions data 164 which matches or substantially matches the environment data 161 is associated with a particular QoS value 162, and the QoS system 199 selects this particular QoS value 162 as a factor which is used to correct the sensor measurements that are generated by the vehicle sensor 150.

Figure 6:
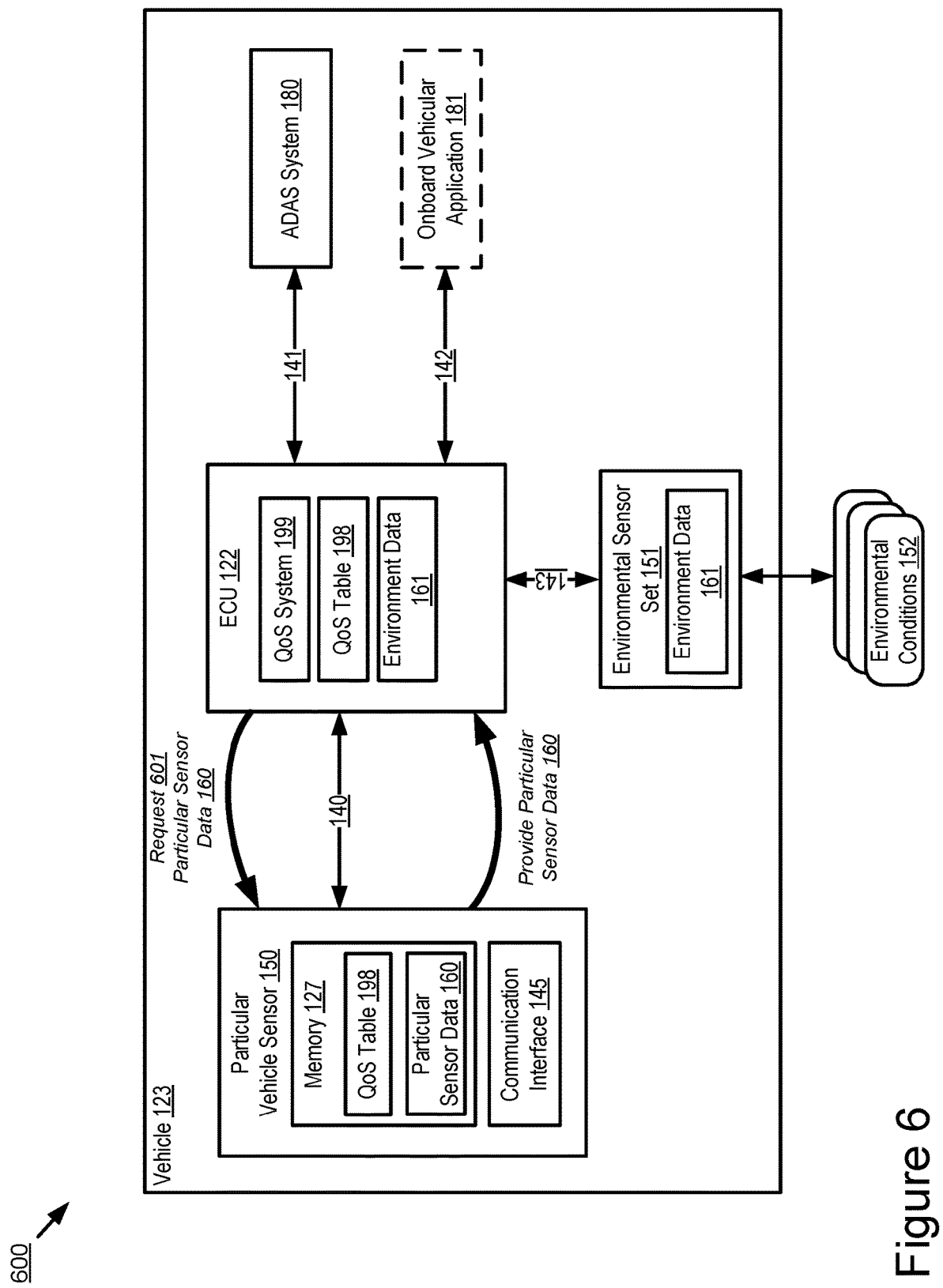
FIG. 6 is a block diagram illustrating a process flow for the QoS system to receive particular sensor data according to some embodiments.

Referring now to FIG. 6, depicted is a block diagram illustrating a process flow 600 for the QoS system 199 to receive particular sensor data 160 according to some embodiments. The process flow 600 of FIG. 6 includes elements that are similar to those described above for the operating environment 100 of FIG. 1, and so, those descriptions will not be repeated.

As depicted, the QoS system 199 transmits a request 601 for particular sensor data 160 to the particular vehicle sensor 150. The request 601 for the particular sensor data 160 is responsive to the request 401 received from the ADAS system 180. Responsive to this request 601, the particular vehicle sensor 150 provides the particular sensor data 160 to the QoS system 199. The QoS system 199 then stores the particular sensor data 160 on the non-transitory memory of the ECU 122.

Figure 7:
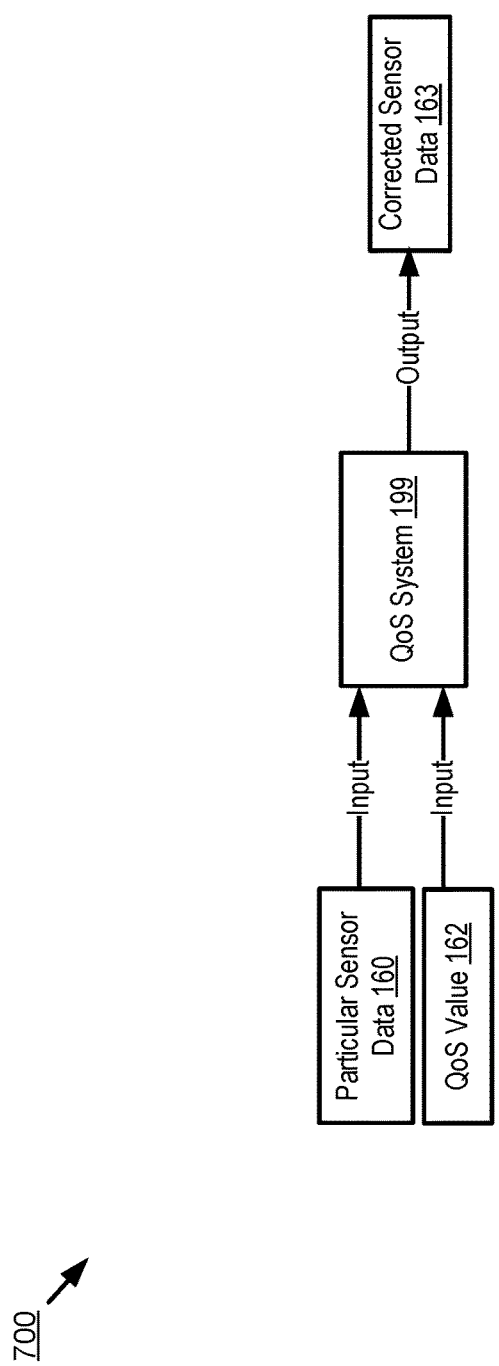
FIG. 7 is a block diagram illustrating a process flow for the QoS system to determine corrected sensor data based on a QoS value and particular sensor data according to some embodiments.

Referring to FIG. 7, depicted is a block diagram illustrating a process flow 700 for the QoS system 199 to determine corrected sensor data 163 based on the QoS value 162 and the particular sensor data 160 according to some embodiments. The process flow 700 of FIG. 7 includes elements that are similar to those described above for the operating environment 100 of FIG. 1, and so, those descriptions will not be repeated.

The QoS system 199 receives the particular sensor data 160 and the QoS value 162 as an input. The QoS value 162 may be determined according to a process similar to the process flow 500 described above with reference to FIG. 5. The particular sensor data 160 may be retrieved according to a process similar to the process flow 600 described above with reference to FIG. 6. Responsive to these inputs, the QoS system 199 outputs the corrected sensor data 163. For example, the QoS value 162 is a factor which is applied to the sensor measurement described by the particular sensor data 160 to generate a corrected sensor measurement which is described by the corrected sensor data 163.

Figure 8:
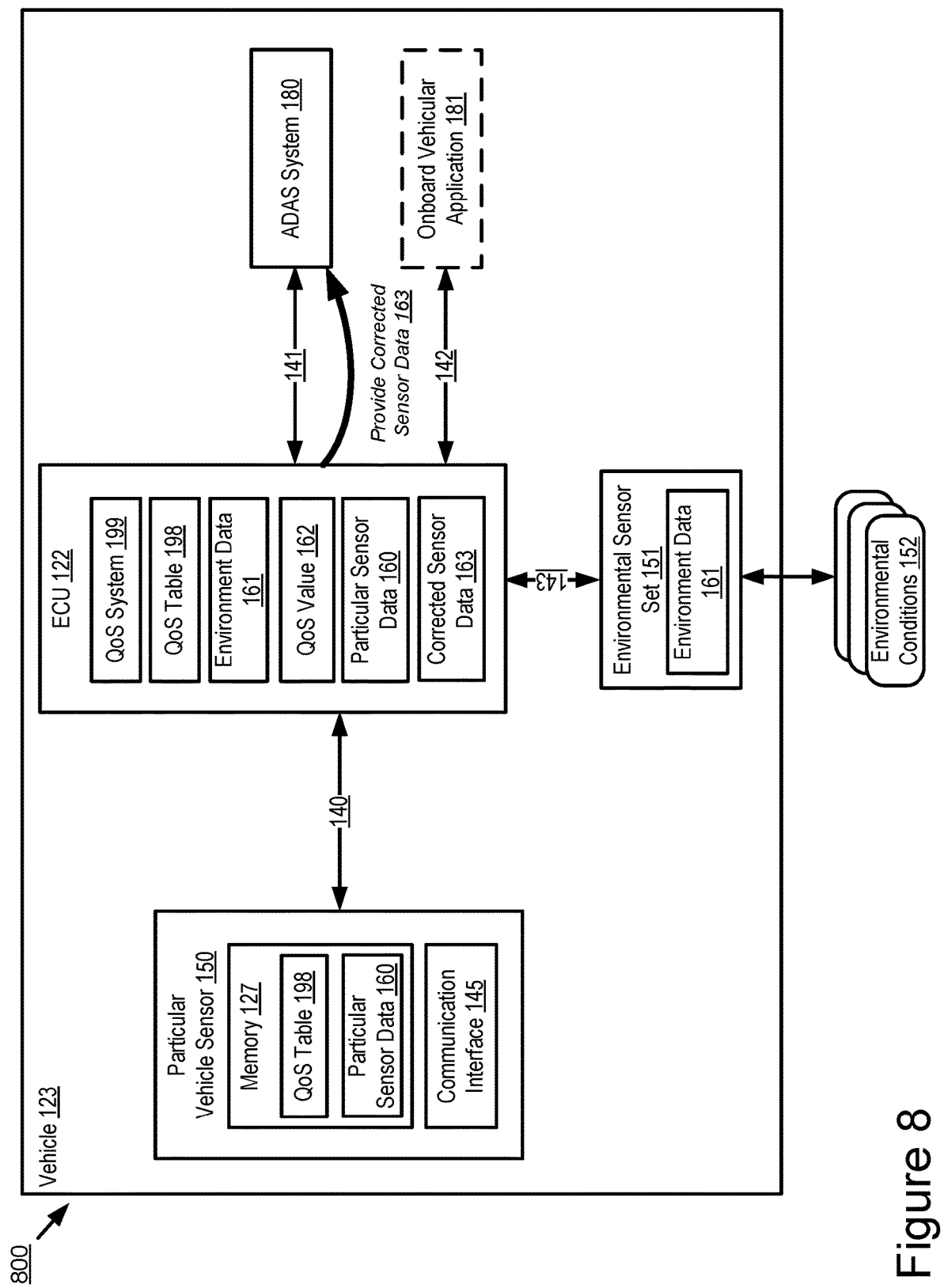
FIG. 8 is a block diagram illustrating a process flow for the QoS system to provide corrected sensor data to an ADAS system according to some embodiments.

Referring to FIG. 8, depicted is a block diagram illustrating a process flow 800 for the QoS system 199 to provide corrected sensor data 163 to an ADAS system 180 according to some embodiments. The process flow 800 of FIG. 8 includes elements that are similar to those described above for the operating environment 100 of FIG. 1, and so, those descriptions will not be repeated.

As depicted, the QoS system 199 transmits a message to the ADAS system 180 that includes corrected sensor data 163. This message is responsive to the request 401 for particular sensor data 160 depicted in FIG. 4. The corrected sensor data 163 is a modified version of the particular sensor data 160 which is more accurate than the particular sensor data 160. The ADAS system 180 then provides its functionality based on the corrected sensor data 163.

Referring now to FIG. 9, depicted is a block diagram illustrating an example of pseudo code 900 for the QoS system 199 according to some embodiments.

Figure 10:
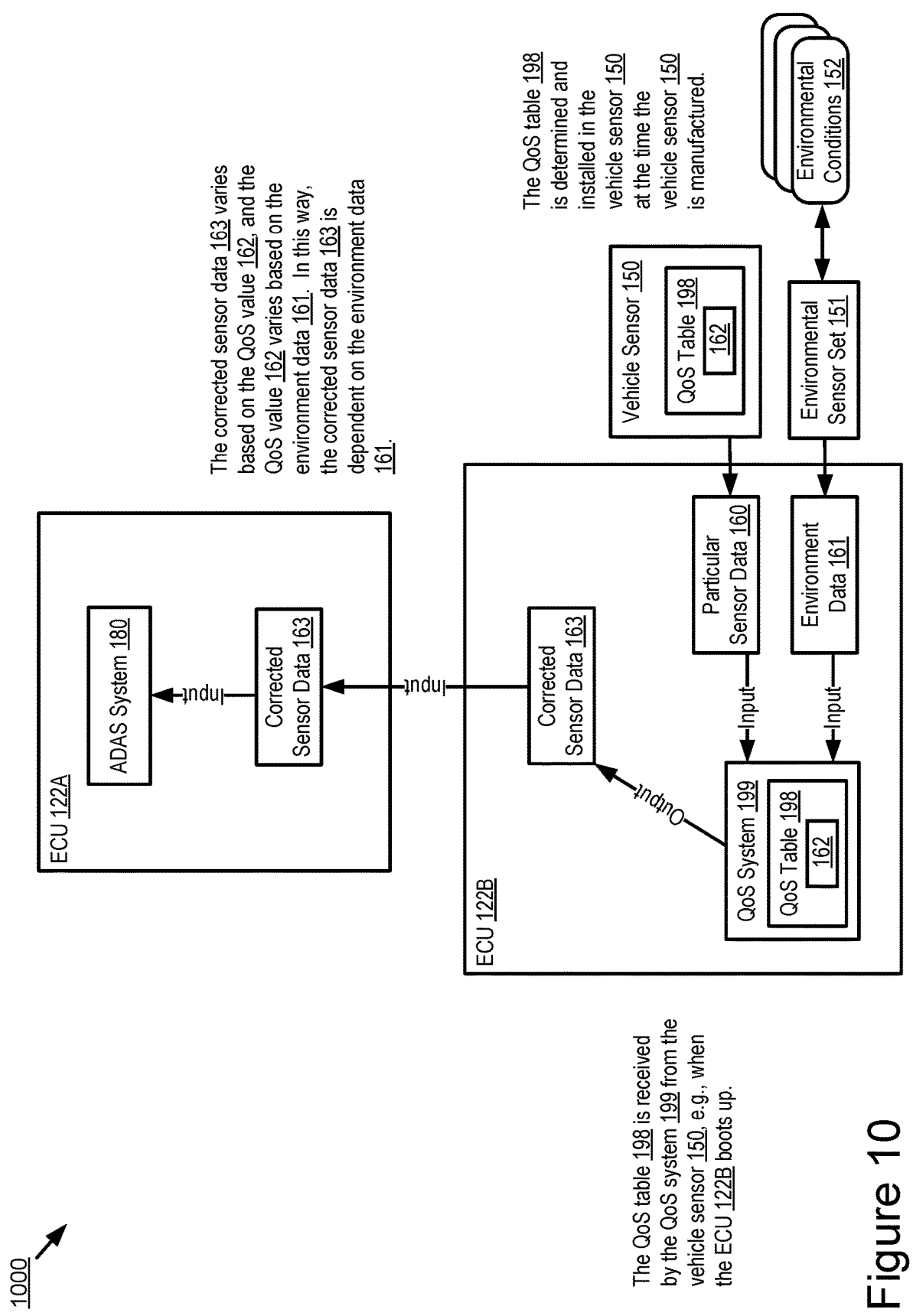
FIG. 10 is a block diagram illustrating a process flow for the QoS system to provide corrected sensor data to an ADAS system according to some embodiments.

Referring now to FIG. 10, depicted is a block diagram illustrating a process flow 1000 for the QoS system 199 to provide corrected sensor data 163 to an ADAS system 180 according to some embodiments. The process flow 1000 of FIG. 10 includes elements that are similar to those described above for the operating environment 100 of FIG. 1, and so, those descriptions will not be repeated.

As depicted, the ECU 122A and the ECU 122B are each electronic control units. The ECU 122A stores and executes the ADAS system 180. The ECU 122B stores and executes the QoS system 199.

Figure 11:
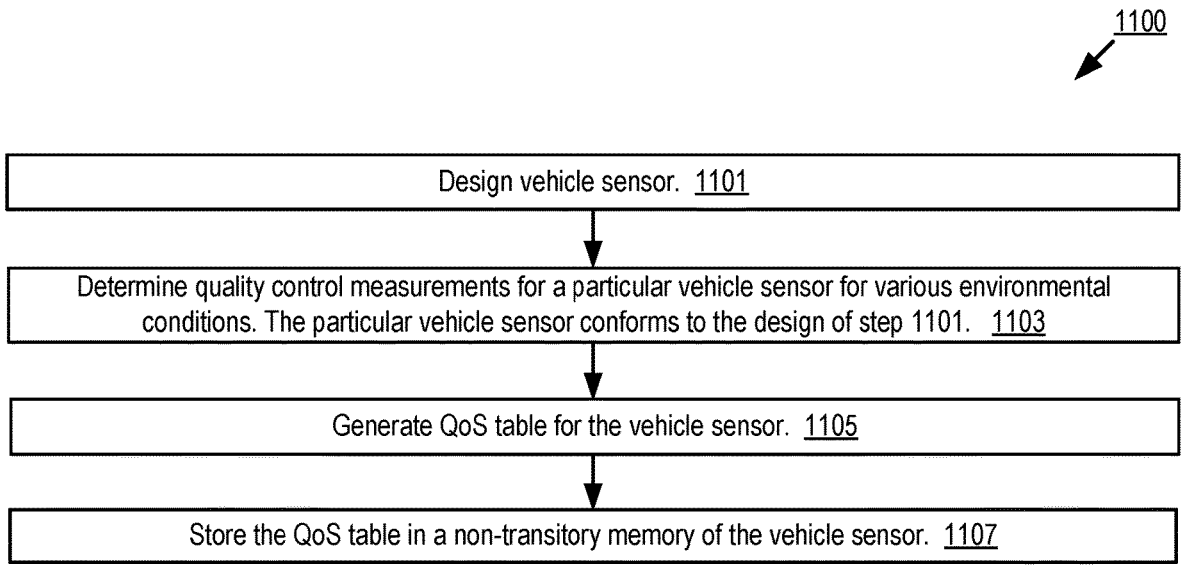
FIG. 11 is an example flow diagram of a method for generating a vehicle sensor that includes a QoS table according to some embodiments.

Referring now to FIG. 11, depicted is an example flow diagram of a method 1100 for generating a vehicle sensor that includes a QoS table according to some embodiments.

At step 1101, a vehicle sensor is designed. The design conforms to the QoS architecture described herein.

At step 1103, quality control measurements are made for a particular vehicle sensor as it operates for various environmental conditions or simulated environmental conditions. The particular vehicle sensor is designed in accordance with the design of step 1101. This step 1103 occurs at the time the vehicle sensor is manufactured and not after the vehicle sensor is installed in a vehicle.

At step 1105, the QoS table for a particular vehicle sensor is generated. Each particular vehicle sensor whose design conforms to the design of step 1101 has its own QoS table which is specific to it because in practice each of these vehicle sensors performs differently when operating in different environmental conditions. In some embodiments, each of these QoS tables is unique.

At step 1107, the QoS table for the particular vehicle sensor is installed in a non-transitory memory of the particular vehicle sensor.

Referring now to FIG. 12, depicted is an example flow diagram of a method 1200 for generating corrected sensor data according to some embodiments.

At step 1201 an ECU of a vehicle is booted up. The ECU includes a QoS system.

At step 1203, a vehicle sensor whose operation is controlled by the ECU sends their QoS table to the QoS system which is installed in the ECU.

At step 1205, an environmental sensor transmits environmental data describing the environmental conditions of the vehicle sensor to the QoS system installed in the ECU.

At step 1207, the QoS system receives the environment data.

At step 1209, the QoS system determines a QoS value for the vehicle sensor based on the environment data and the QoS table for the vehicle sensor.

Steps 1211 and 1213 of FIG. 12 are depicted using a dashed line to indicate that they are alternative steps of the method 1200. When the method 1200 includes step 1211, then the method 1200 does not include step 1213. When the method 1200 includes step 1213, then the method 1200 does not include step 1211. In some embodiments, the method 1200 always includes either step 1211 or step 1213.

At step 1211, the QoS value is provided to an ADAS system that uses the sensors measurements of the vehicle sensor to provide its functionality. The ADAS system also receives particular sensor data recorded by the vehicle sensor. The ADAS system then uses the QoS value to determine corrected sensor data based on the QoS value and the particular sensor data.

At step 1213, each sensor measurement of the vehicle sensor is corrected based on the QoS value to determine a corrected sensor measurement that is described by corrected sensor data. The corrected sensor data is then provided to an ADAS system that uses the sensor measurements of the vehicle sensor to provide its functionality.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A system that determines corrected sensor measurements in a vehicle, the system comprising:
   a vehicle sensor that provides a sensor measurement, wherein the vehicle sensor includes a non-transitory memory that stores a quality of service table that describes various combinations of environmental conditions in which the vehicle sensor operates and a quality of service value associated with the vehicle sensor operating in a particular combination of environmental conditions, wherein the quality of service value includes a factor that corrects for an error rate of the vehicle sensor when operating in the particular combination of environmental conditions so that applying the factor to the sensor measurement generates a corrected sensor measurement and wherein the quality of service table is determined for the vehicle sensor based on quality control testing performed on the vehicle sensor at a time of manufacturing the vehicle sensor to determine the factor for the vehicle sensor so that the factor is personalized for the vehicle sensor on a sensor-by-sensor basis at the time of manufacturing the vehicle sensor and not after the vehicle sensor is installed in the vehicle; and
   an electronic control unit communicatively coupled to a vehicle sensor set to receive the sensor measurement from the vehicle sensor set, the electronic control unit including a quality of service system that monitors a current combination of environmental conditions in which the vehicle is presently operating and queries the quality of service table for the quality of service value that is associated with the particular combination that matches the current combination of environmental conditions and wherein the electronic control unit applies the factor included in the quality of service value to the sensor measurement to determine the corrected sensor measurement.

2. A method that determines corrected sensor measurements in a vehicle, the method comprising:
   receiving environment data describing a current combination of environmental conditions in which a vehicle sensor presently operates, wherein the vehicle sensor provides a sensor measurement;
   determining a quality of service value for when the vehicle sensor operates in the current combination of environmental conditions, wherein the quality of service value includes a factor that corrects for an error rate of the vehicle sensor when operating in the current combination of environmental conditions so that applying the factor to the sensor measurement generates a corrected sensor measurement;
   querying a quality of service table for the quality of service value that is associated with a particular combination of environmental conditions that matches the current combination of environmental conditions, wherein the quality of service value is and personalized for the vehicle sensor and the quality of service table is determined for the vehicle sensor based on quality control testing performed on the vehicle sensor at a time of manufacturing the vehicle sensor to determine the factor for the vehicle sensor so that the factor are is personalized on a sensor-by-sensor basis at the time of manufacturing the vehicle sensor and not after the vehicle sensor is installed in the vehicle; and applying the quality of service value and the factor, by an electronic control unit, to the sensor measurement to determine the corrected sensor measurement.

3. The method of claim 2, wherein the quality of service table describes various combinations of environmental conditions and the various combinations include two or more of a degree of illumination, a degree of temperature, or a degree of wetness.

4. The method of claim 2 further comprising monitoring a current combination of environmental conditions in which the vehicle sensor is presently operating and generating the environment data describing the current combination of environmental conditions.

5. The method of claim 4 further comprising receiving a request for a corrected sensor measurement from a vehicular application and providing the corrected sensor measurement to the vehicular application responsive to the request.

6. The method of claim 2, further comprising:
an advanced driver assistance system (ADAS system) communicatively coupled to the electronic control unit to receive the corrected sensor measurement from the electronic control unit and wherein querying the quality of service table for the quality of service value is performed by the ADAS system.

7. The method of claim 2, wherein the quality of service table is stored in a memory of the vehicle sensor and the quality of service table is personalized for this vehicle sensor.

8. The method of claim 2, further comprising:
determining quality control measurements for a vehicle sensor that conforms to a design of the vehicle sensor.

9. The method of claim 8, wherein the vehicle is a highly autonomous vehicle.

10. The method of claim 2, wherein at least one step of the method is executed by the electronic control unit.

11. The method of claim 2, wherein the vehicle sensor include two or more of a light sensor, a thermometer, or a humidistat.

12. The method of claim 2, further comprising:
an advanced driver assistance system (ADAS system) communicatively coupled to the electronic control unit to receive the corrected sensor measurement from the electronic control unit and wherein the ADAS system is an element of the vehicle which renders the vehicle a highly autonomous vehicle.

13. A computer program product that determines corrected sensor measurements in a vehicle, the computer program product comprising a non-transitory memory of the vehicle that stores computer code that, when executed by an onboard vehicle computer of the vehicle, causes the onboard vehicle computer to execute steps comprising:
receiving environment data describing a current combination of environmental conditions in which a vehicle sensor presently operates, wherein the vehicle sensor provides a sensor measurement;

determining a quality of service value for when the vehicle sensor operates in the current combination of environmental conditions, wherein the quality of service value includes a factor that corrects for an error rate of the vehicle sensor when operating in the current combination of environmental conditions so that applying the factor to the sensor measurement generates a corrected sensor measurement;

querying a quality of service table for the quality of service value that is associated with a particular combination of environmental conditions that matches the current combination of environmental conditions, wherein the quality of service value is personalized for the vehicle sensor and the quality of service table is determined for the vehicle sensor based on quality control testing performed on the vehicle sensor at a time of manufacturing the vehicle sensor to determine the factor for the vehicle sensor so that the factor are is personalized on a sensor-by-sensor basis at the time of manufacturing the vehicle sensor and not after the vehicle sensor is installed in the vehicle; and applying the quality of service value and the factor, by an electronic control unit, to the sensor measurement to determine the corrected sensor measurement.

14. The computer program product of claim 13, wherein the quality of service table describes various combinations of environmental conditions that include two or more of a degree of illumination, a degree of temperature, or a degree of wetness.

15. The computer program product of claim 13 further comprising monitoring a current combination of environmental conditions in which the vehicle sensor is presently operating and generating the environment data describing the current combination of environmental conditions.

16. The computer program product of claim 15 sensor further comprising receiving a request for a corrected sensor measurement from a vehicular application and providing the corrected sensor measurement to the vehicular application responsive to the request.

17. The computer program product of claim 13, further comprising:
an advanced driver assistance system (ADAS system) communicatively coupled to the electronic control unit to receive the corrected sensor measurement from the electronic control unit and wherein querying the quality of service table for the quality of service value is performed by the ADAS system.

18. The computer program product of claim 13, wherein the onboard vehicle computer is an electronic control unit.

19. The computer program product of claim 13, wherein the vehicle is a highly autonomous vehicle.

20. The computer program product of claim 13, wherein the quality of service table includes a plurality of different combinations of environmental conditions associated with different quality of service values and querying the quality of service table includes identifying from among the plurality of different combinations of environmental conditions a selected one that matches the current combination of environmental conditions.

* * * * *